(12) United States Patent
Apicella et al.

(10) Patent No.: US 11,940,068 B2
(45) Date of Patent: Mar. 26, 2024

(54) PIPE JOINT, PIPE AND METHOD OF JOINING PIPE SECTIONS

(71) Applicant: CONSTRUCTION RESEARCH & TECHNOLOGY GMBH, Trostberg (DE)

(72) Inventors: Frank Apicella, Hiram, OH (US); Emmanuel Attiogbe, Solon, OH (US); William Gold, Chagrin Falls, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 15/545,453

(22) PCT Filed: Jan. 22, 2015

(86) PCT No.: PCT/US2015/012380
§ 371 (c)(1),
(2) Date: Jul. 21, 2017

(87) PCT Pub. No.: WO2016/118139
PCT Pub. Date: Jul. 28, 2016

(65) Prior Publication Data
US 2018/0010721 A1 Jan. 11, 2018

(51) Int. Cl.
*F16L 25/00* (2006.01)
*B28B 21/92* (2006.01)
(Continued)

(52) U.S. Cl.
CPC ........ *F16L 25/0027* (2013.01); *B28B 21/925* (2013.01); *F16L 9/085* (2013.01); *F16L 9/22* (2013.01)

(58) Field of Classification Search
CPC ......... F16L 25/0027; F16L 9/085; F16L 9/22; F16L 13/029; F16L 13/124; F16L 51/005;
(Continued)

(56) References Cited

U.S. PATENT DOCUMENTS

| 3,742,985 A | 7/1973 | Rubenstein |
| 4,243,075 A * | 1/1981 | McPherson |

(Continued)

FOREIGN PATENT DOCUMENTS

| CA | 886457 A | 12/1968 |
| CH | 124589 A | 4/1928 |

(Continued)

OTHER PUBLICATIONS

DuraWrap, Sep. 11, 2014, Enecon Corporation, pp. 1-2 (Year: 2014).*

(Continued)

*Primary Examiner* — William S. Choi
(74) *Attorney, Agent, or Firm* — Curatolo Sidoti & Trillis Co., LPA; Salvatore A. Sidoti; Floyd Trillis, III

(57) ABSTRACT

A pipe joint and elongated cementitious pipe is formed by joining abutting ends of adjacent pipe sections with a fiber reinforced composite material without the need for the pipe sections to have other connection means, such as the standard bell and spigot end connections. Also disclosed is a cementitious pipe including at least two cementitious pipe sections having ends that are joined together with a fiber reinforced polymer composite material. The cementitious pipe sections and resulting cementitious pipe may have a substantially uniform wall thickness and substantially uniform inner and outer diameters near the opposite ends of the pipe sections. Also provided is a method for joining cementitious pipe sections with a fiber reinforced composite material to manufacture an elongated cementitious pipe, such as an elongated concrete pipe.

11 Claims, 9 Drawing Sheets

(51) Int. Cl.
*F16L 9/08* (2006.01)
*F16L 9/22* (2006.01)

(58) Field of Classification Search
CPC ....... F16L 9/08; F16L 25/0018; F16L 13/103; F16L 13/10; F16L 13/11; F16L 13/113; B28B 21/925
USPC .......... 285/285.1, 230, 293.1, 422, 923, 9.2; 138/175
See application file for complete search history.

(56) References Cited

U.S. PATENT DOCUMENTS

| | | | |
|---|---|---|---|
| 4,499,923 A | | 2/1985 | Hammer |
| 5,549,949 A | | 8/1996 | Williams et al. |
| 5,732,743 A | * | 3/1998 | Livesay |
| 5,951,812 A | | 9/1999 | Gilchrist |
| 2003/0090108 A1 | * | 5/2003 | Palsson |
| 2003/0116214 A1 | * | 6/2003 | Meli |
| 2005/0134045 A1 | | 6/2005 | Meera et al. |
| 2011/0297316 A1 | * | 12/2011 | Jackson |

FOREIGN PATENT DOCUMENTS

| | | | |
|---|---|---|---|
| DE | 2116137 | 12/1971 | |
| DE | 2530370 A1 * | 1/1977 | ............ F16L 13/103 |
| GB | 1420114 A | 7/1972 | |
| GB | 2135005 A | 8/1984 | |
| WO | WO 93/00546 A1 | 1/1993 | |
| WO | WO 03/042590 | 11/2001 | |

OTHER PUBLICATIONS

International Search Report, PCT/EP2017/054215, dated Jun. 13, 2017.
International Written Opinion, PCT/EP2017/054215, dated Jun. 13, 2017.
International Search Report for PCT/US2015/012380, dated Sep. 28, 2015.
International Written Opinion for PCT/US2015/012380, dated Sep. 28, 2015.
International Preliminary Report on Patentability for PCT/US2015/012380, dated Aug. 3, 2017.

* cited by examiner

PIPE JOINT, PIPE AND METHOD OF JOINING PIPE SECTIONS

CROSS REFERENCE TO RELATED APPLICATIONS

This application is a national stage application of International Application No. PCT/US2015/012380, filed 22 Jan. 2015, from which priority is claimed, and which application is incorporated herein by reference.

TECHNICAL FIELD

Provided is a pipe joint, an elongated cementitious pipe and method of joining pipe sections for form an elongated cementitious pipe. The pipe joint and method of joining pipe sections to form an elongated cementitious pipe utilizes a fiber reinforced polymer composite to join and strengthen the transition between the ends of adjacent pipe sections.

BACKGROUND

Wire reinforced concrete pipe has been used in underground water systems. Concrete pipes lose their structural integrity over time due to water permeation within the exposed concrete, joint leaking and joint failure. As a result, pipes located either below or above ground need to be repaired due to deterioration.

The use of composite reinforcement materials has proven to be advantageous, because the composite materials possess high strength, are lightweight, highly durable, non-corrosive and chemically resistant. The composite reinforcement materials are also easily formed around complex or irregular shaped structures. In addition, the composite reinforcement materials are easy to conceal, thereby resulting in only minimal changes to the appearance of the existing concrete or masonry structure.

Connections between concrete pipe sections are typically "bell and spigot" connections. The "bell" connection typically has a greater diameter than the "spigot" connection, which allows for the "spigot" connection to be inserted into the "bell" connection. These types of connections require that one end of pipe be forcefully "stabbed" into the previous section of pipe as the pipe is being laid. Due to the forceful nature of the stabbing process, there is an increased likelihood that the "bell" or "spigot" end connections could be damaged before any actual service. Furthermore, concrete pipe sections using bell and spigot connections require the presence of rubber sealing gaskets to prevent leakage and maintain a watertight joint.

Concrete pipes with bell and spigot connections are also costly to manufacture due to labor required to the produce the bell and spigot end shapes of the pipe sections. Bell and spigot connection pipe is also problematic when thin walled pipe is needed for various jobs, as it is difficult to maintain specified tolerances with smaller components. When thin wall pipes are required, there is difficulty in forming proper bell and spigot connection ends.

Disclosed is a cementitious pipe section comprising a hardened cementitious matrix, and a reinforcement at least partially embedded in said hardened cementitious matrix, wherein said cementitious pipe does not have integral end connections for connecting one pipe section to another pipe section, such bell and spigot end connections at opposite ends of the pipe section. The phrase "integral end connections" refers to connection means that are formed in the pipe itself, or formed as part of the pipe section itself, such as, without limitation, bell-and-spigot type connections and tongue-and-groove type connections.

According to certain illustrative embodiments, the hardened cementitious pipe section comprises a hardened cementitious matrix, and a reinforcement at least partially embedded in said hardened cementitious matrix, wherein said cementitious pipe does not have integral end connections for connection one pipe section to another pipe section, such as bell and spigot end connections, at opposite ends of the pipe section, and wherein said ends of said hardened cementitious pipe section have a substantially uniform wall thickness and outer diameter.

According to certain illustrative embodiments, the hardened concrete pipe comprises a hardened concrete material, and a reinforcement at least partially embedded in said hardened concrete material, wherein said cementitious pipe does not have bell and spigot end connections at opposite ends of the pipe section.

According to certain illustrative embodiments, the hardened concrete pipe section comprises a hardened concrete material, and a reinforcement at least partially embedded in said hardened concrete material, wherein said cementitious pipe does not have integral end connections to connection one pipe section to another pipe section, such as bell and spigot end connections, at opposite ends of the pipe section, and wherein said ends of said hardened concrete pipe section have a substantially uniform wall thickness and outer diameter.

According to certain illustrative embodiments, a method of making a hardened cementitious pipe comprises providing a hardenable cementitious matrix, providing a reinforcement, combining said reinforcement with said hardenable cementitious matrix, forming said hardenable cementitious matrix into a substantially tubular green pipe shape, wherein said green pipe shape does not have integral end connections for connecting one pipe section to another pipe section, such as bell and spigot end connections, at opposite ends of the pipe shape, and allowing said cementitious matrix to harden.

According to certain illustrative embodiments, the method of making a hardened cementitious pipe comprises providing a hardenable cementitious matrix, providing a reinforcement, combining said reinforcement with said hardenable cementitious matrix, forming said hardenable cementitious matrix into a substantially tubular green pipe shape, wherein said green pipe shape does not have integral end connections for connecting one pipe section to another pipe section, such as bell and spigot end connections at opposite ends of the pipe section, and wherein said ends of said green pipe shape have a substantially uniform wall thickness and outer diameter, and allowing said cementitious matrix to harden.

According to certain illustrative embodiments, a method of making a hardened cementitious pipe comprises providing a hardenable cementitious matrix, providing an inorganic fiber fabric reinforcement, forming said inorganic fiber fabric reinforcement into a substantially cylindrical shape, infiltrating said inorganic fiber fabric reinforcement with said hardenable cementitious matrix to form a green pipe shape, wherein said green pipe shape does not have integral end connections for connecting one pipe section to another pipe section, such as bell and spigot end connections at opposite ends of the pipe section, and allowing said green pipe shape to harden.

According to certain illustrative embodiments, a method of making a hardened cementitious pipe comprises providing a hardenable cementitious matrix, providing an inorganic fiber fabric reinforcement, forming said inorganic fiber fabric reinforcement into a substantially cylindrical shape, infiltrating said inorganic fiber fabric reinforcement with said hardenable cementitious matrix to form a green pipe shape, wherein said green pipe shape does not have integral end connections for connecting one pipe section to another pipe section, such as bell and spigot end connections at opposite ends of the pipe section, and wherein said ends of said green pipe shape have a substantially uniform wall thickness and outer diameter, and allowing said green pipe shape to harden.

According to certain illustrative embodiments, a method of making a hardened cementitious pipe comprises providing a hardenable concrete material, providing a reinforcement, combining said reinforcement with said hardenable concrete material, forming said hardenable concrete material into a substantially tubular green pipe shape, wherein said green pipe shape does not have integral end connections for connecting one pipe section to another pipe section, such as bell and spigot end connections at opposite ends of the pipe shape, and allowing said concrete material to harden.

According to certain illustrative embodiments, the method of making a hardened cementitious pipe comprises providing a hardenable concrete material, providing a reinforcement, combining said reinforcement with said hardenable concrete material, forming said hardenable concrete material into a substantially tubular green pipe shape, wherein said green pipe shape does not have integral end connections for connecting one pipe section to another pipe section, such as bell and spigot end connections at opposite ends of the pipe section, and wherein said ends of said green pipe shape have a substantially uniform wall thickness and outer diameter, and allowing said concrete material to harden.

According to certain illustrative embodiments, a method of making a hardened cementitious pipe comprises providing a hardenable concrete material, providing an inorganic fiber fabric reinforcement, forming said inorganic fiber fabric reinforcement into a substantially cylindrical shape, infiltrating said inorganic fiber fabric reinforcement with said hardenable concrete material to form a green pipe shape, wherein said green pipe shape does not have integral end connections for connecting one pipe section to another pipe section, such as bell and spigot end connections at opposite ends of the pipe section, and allowing said green pipe shape to harden.

According to certain illustrative embodiments, a method of making a hardened cementitious pipe comprises providing a hardenable concrete material, providing an inorganic fiber fabric reinforcement, forming said inorganic fiber fabric reinforcement into a substantially cylindrical shape, infiltrating said inorganic fiber fabric reinforcement with said hardenable concrete material to form a green pipe shape, wherein said green pipe shape does not have integral end connections for connecting one pipe section to another pipe section, such as bell and spigot end connections at opposite ends of the pipe section, and wherein said ends of said green pipe shape have a substantially uniform wall thickness and outer diameter, and allowing said green pipe shape to harden.

Also disclosed is a cementitious pipe comprising a plurality of cementitious pipe sections not having integral end connections at opposite ends of said pipe sections, said pipe sections joined together in an end-to-end manner with a fiber reinforced polymer composite.

According to certain illustrative embodiments, the cementitious pipe comprises a plurality of reinforced cementitious pipe sections not having integral end connections at opposite ends of said pipe sections, said pipe sections joined together in an end-to-end manner with a fiber reinforced polymer composite.

According to certain illustrative embodiments, a cementitious pipe comprises a plurality of cementitious pipe sections not having bell and spigot connections at opposite ends, said pipe sections joined together in an end-to-end manner with a fiber reinforced polymer composite.

According to certain illustrative embodiments, a cementitious pipe comprises a plurality of reinforced cementitious pipe sections not having bell and spigot connections at opposite ends, said pipe sections joined together in an end-to-end manner with a fiber reinforced polymer composite.

According to certain illustrative embodiments, a cementitious pipe comprises a plurality of cementitious pipe sections not having bell and spigot connections at opposite ends of said pipe sections, and wherein said ends of said pipe sections have a substantially uniform wall thickness and outer diameter, said pipe sections joined together in an end-to-end manner with a fiber reinforced polymer composite.

According to certain illustrative embodiments, a cementitious pipe comprises a plurality of reinforced cementitious pipe sections not having bell and spigot connections at opposite ends of said pipe sections, and wherein said ends of said pipe sections have a substantially uniform wall thickness and outer diameter, said pipe sections joined together in an end-to-end manner with a fiber reinforced polymer composite.

According to certain illustrative embodiments, a hardened concrete pipe comprises a plurality of concrete pipe sections not having integral end connections at opposite ends of said pipe sections, said pipe sections joined together in an end-to-end manner with a fiber reinforced polymer composite.

According to certain illustrative embodiments, a hardened concrete pipe comprises a plurality of reinforced concrete pipe sections not having integral end connections at opposite ends of said pipe sections, said pipe sections joined together in an end-to-end manner with a fiber reinforced polymer composite.

According to certain illustrative embodiments, a hardened concrete pipe comprises a plurality of concrete pipe sections not having bell and spigot connections at opposite ends of said pipe sections, said pipe sections joined together in an end-to-end manner with a fiber reinforced polymer composite.

According to certain illustrative embodiments, a hardened concrete pipe comprises a plurality of reinforced concrete pipe sections not having bell and spigot connections at opposite ends of said pipe sections, said pipe sections joined together in an end-to-end manner with a fiber reinforced polymer composite.

According to certain illustrative embodiments, a hardened concrete pipe comprises a plurality of concrete pipe sections not having integral ends connections at opposite ends of said pipe sections, and wherein said ends of said pipe sections have a substantially uniform wall thickness and outer diameter, said pipe sections joined together in an end-to-end manner with a fiber reinforced polymer composite.

According to certain illustrative embodiments, a hardened concrete pipe comprises a plurality of reinforced concrete pipe sections not having integral end connections at opposite ends of said pipe sections, and wherein said ends of said pipe sections have a substantially uniform wall thickness and outer diameter, said pipe sections joined together in an end-to-end manner with a fiber reinforced polymer composite.

According to certain illustrative embodiments, a hardened concrete pipe comprises a plurality of concrete pipe sections not having bell and spigot connections at opposite ends of said pipe sections, and wherein said ends of said pipe sections have a substantially uniform wall thickness and outer diameter, said pipe sections joined together in an end-to-end manner with a fiber reinforced polymer composite.

According to certain illustrative embodiments, a hardened concrete pipe comprises a plurality of reinforced concrete pipe sections not having bell and spigot connections at opposite ends of said pipe sections, and wherein said ends of said pipe sections have a substantially uniform wall thickness and outer diameter, said pipe sections joined together in an end-to-end manner with a fiber reinforced polymer composite.

According to certain illustrative embodiments, an inorganic fiber reinforced cementitious pipe comprises a plurality of hardened cementitious pipe sections reinforced with an inorganic fiber reinforcement at least partially embedded therein, wherein said cementitious pipe sections do not have integral end connections at opposite ends of said pipe sections, and wherein said pipe sections are positioned in an end-to-end manner and joined together by a fiber reinforced polymer composite material.

According to certain illustrative embodiments, an inorganic fiber reinforced cementitious pipe comprises a plurality of hardened cementious pipe sections reinforced with an inorganic fiber reinforcement at least partially embedded therein, wherein said cementitious pipe sections do not have bell and spigot end connections at opposites ends of said pipe sections, and wherein said pipe sections are positioned in an end-to-end manner and joined together by a fiber reinforced polymer composite material.

According to certain illustrative embodiments, an inorganic fiber reinforced concrete pipe comprises a plurality of hardened concrete pipe sections reinforced with an inorganic fiber reinforcement at least partially embedded therein, wherein said concrete pipe sections do not have integral end connections at opposites ends of said pipe sections, and wherein said pipe sections are positioned in an end-to-end manner and joined together by a fiber reinforced polymer composite material.

According to certain illustrative embodiments, an inorganic fiber reinforced concrete pipe comprises a plurality of hardened concrete pipe sections reinforced with an inorganic fiber reinforcement at least partially embedded therein, wherein said concrete pipe sections do not have bell and spigot end connections at opposites ends of said pipe sections, and wherein said pipe sections are positioned in an end-to-end manner and joined together by a fiber reinforced polymer composite material.

According to certain illustrative embodiments, an inorganic fiber reinforced cementitious pipe comprises a plurality of hardened cementitious pipe sections reinforced with an inorganic fiber reinforcement at least partially embedded therein, wherein said cementitious pipe sections do not have integral end connections at opposites ends of said pipe sections, wherein said ends of said pipe sections have a substantially uniform wall thickness and outer diameter, and wherein said pipe sections are positioned in an end-to-end manner and joined together by a fiber reinforced polymer composite material.

According to certain illustrative embodiments, an inorganic fiber reinforced cementitious pipe comprises a plurality of hardened cementitious pipe sections reinforced with an inorganic fiber reinforcement at least partially embedded therein, wherein said cementitious pipe sections do not have bell and spigot end connections at opposites ends of said pipe sections, wherein said ends of said pipe sections have a substantially uniform wall thickness and outer diameter, and wherein said pipe sections are positioned in an end-to-end manner and joined together by a fiber reinforced polymer composite material.

According to certain illustrative embodiments, an inorganic fiber reinforced concrete pipe comprises a plurality of hardened concrete pipe sections reinforced with an inorganic fiber reinforcement at least partially embedded therein, wherein said concrete pipe sections do not have integral end connections at opposites ends of said pipe sections, wherein said ends of said pipe sections have a substantially uniform wall thickness and outer diameter, and wherein said pipe sections are positioned in an end-to-end manner and joined together by a fiber reinforced polymer composite material.

According to certain illustrative embodiments, an inorganic fiber reinforced concrete pipe comprises a plurality of hardened concrete pipe sections reinforced with an inorganic fiber reinforcement at least partially embedded therein, wherein said concrete pipe sections do not have bell and spigot end connections at opposites ends of said pipe sections, wherein said ends of said pipe sections have a substantially uniform wall thickness and outer diameter, and wherein said pipe sections are positioned in an end-to-end manner and joined together by a fiber reinforced polymer composite material.

According to certain illustrative embodiments, a method of making an elongated cementitious pipe comprising joining together a plurality of cementitious pipe sections not having integral end connections at opposite ends of said pipe sections in an end-to-end manner with a fiber reinforced polymer composite material.

According to certain illustrative embodiments, a method of making an elongated cementitious pipe comprising joining together a plurality of reinforced cementitious pipe sections not having integral end connections at opposite ends of said pipe sections in an end-to-end manner with a fiber reinforced polymer composite material.

According to certain illustrative embodiments, a method of making an elongated cementitious pipe comprising joining together a plurality of inorganic fabric reinforced cementitious pipe sections not having integral end connections at opposite ends of said pipe sections in an end-to-end manner with a fiber reinforced polymer composite material.

According to certain illustrative embodiments, a method of making an elongated cementitious pipe comprising joining together a plurality of organic fabric reinforced cementitious pipe sections not having integral end connections at opposite ends of said pipe sections in an end-to-end manner with a fiber reinforced polymer composite material.

According to certain illustrative embodiments, a method of making an elongated cementitious pipe comprising joining together a plurality of metal fabric reinforced cementitious pipe sections not having integral end connections at opposite ends of said pipe sections in an end-to-end manner with a fiber reinforced polymer composite material.

According to certain illustrative embodiments, a method of making an elongated concrete pipe comprising joining together a plurality of concrete pipe sections not having integral end connections at opposite ends of said pipe sections in an end-to-end manner with a fiber reinforced polymer composite material.

According to certain illustrative embodiments, a method of making an elongated concrete pipe comprising joining together a plurality of reinforced concrete pipe sections not having integral end connections at opposite ends of said pipe sections in an end-to-end manner with a fiber reinforced polymer composite material.

According to certain illustrative embodiments, a method of making an elongated concrete pipe comprising joining together a plurality of inorganic fabric reinforced concrete pipe sections not having integral end connections at opposite ends of said pipe sections in an end-to-end manner with a fiber reinforced polymer composite material.

According to certain illustrative embodiments, a method of making an elongated concrete pipe comprising joining together a plurality of organic fabric reinforced concrete pipe sections not having integral end connections at opposite ends of said pipe sections in an end-to-end manner with a fiber reinforced polymer composite material.

According to certain illustrative embodiments, a method of making an elongated concrete pipe comprising joining together a plurality of metal fabric reinforced concrete pipe sections not having integral end connections at opposite ends of said pipe sections in an end-to-end manner with a fiber reinforced polymer composite material.

According to certain illustrative embodiments, a method of making an elongated cementitious pipe comprising providing a plurality of cementitious pipe sections not having integral end connections at opposite ends of said pipe sections; and joining said pipe sections in an end-to-end manner with a fiber reinforced polymer composite material.

According to certain illustrative embodiments, a method of making an elongated cementitious pipe comprising providing a plurality of reinforced cementitious pipe sections not having integral end connections at opposite ends of said pipe sections; and joining said pipe sections in an end-to-end manner with a fiber reinforced polymer composite material.

According to certain illustrative embodiments, a method of making an elongated cementitious pipe comprising providing a plurality of inorganic fabric reinforced cementitious pipe sections not having integral end connections at opposite ends of said pipe sections; and joining said pipe sections in an end-to-end manner with a fiber reinforced polymer composite material.

According to certain illustrative embodiments, a method of making an elongated cementitious pipe comprising providing a plurality of organic fabric reinforced cementitious pipe sections not having integral end connections at opposite ends of said pipe sections; and joining said pipe sections in an end-to-end manner with a fiber reinforced polymer composite material.

According to certain illustrative embodiments, a method of making an elongated cementitious pipe comprising providing a plurality of metal fabric reinforced cementitious pipe sections not having integral end connections at opposite ends of said pipe sections; and joining together said pipe sections in an end-to-end manner with a fiber reinforced polymer composite material.

According to certain illustrative embodiments, a method of making an elongated concrete pipe comprising providing a plurality of concrete pipe sections not having integral end connections at opposite ends of said pipe sections, and joining together said pipe sections in an end-to-end manner with a fiber reinforced polymer composite material.

According to certain illustrative embodiments, a method of making an elongated concrete pipe comprising providing a plurality of reinforced concrete pipe sections not having integral end connections at opposite ends of said pipe sections, and joining together said pipe sections in an end-to-end manner with a fiber reinforced polymer composite material.

According to certain illustrative embodiments, a method of making an elongated concrete pipe comprising providing a plurality of inorganic fabric reinforced concrete pipe sections not having integral end connections at opposite ends of said pipe sections, and joining together said pipe sections in an end-to-end manner with a fiber reinforced polymer composite material.

According to certain illustrative embodiments, a method of making an elongated concrete pipe comprising providing a plurality of organic fabric reinforced concrete pipe sections not having integral end connections at opposite ends of said pipe sections, and joining together said pipe sections in an end-to-end manner with a fiber reinforced polymer composite material.

According to certain illustrative embodiments, a method of making an elongated concrete pipe comprising providing a plurality of metal fabric reinforced concrete pipe sections not having integral end connections at opposite ends of said pipe sections, and joining together said pipe sections in an end-to-end manner with a fiber reinforced polymer composite material.

According to certain illustrative embodiments, a method of making a cementitious pipe comprises providing a hardenable cementitious matrix, providing a reinforcement, combining said reinforcement with said hardenable cementitious matrix to form a substantially tubular green pipe section not having integral end connections at opposite ends of said green pipe section, allowing said green pipe sections to harden, and joining a plurality of said pipe sections together in an end-to-end manner with a fiber reinforced polymer composite material.

According to certain illustrative embodiments, a method of making a reinforced cementitious pipe comprises providing a hardenable cementitious matrix, providing a reinforcement, combining said reinforcement with said hardenable cementitious matrix to form a substantially tubular green pipe section not having bell and spigot end connections at opposite ends of said green pipe section, allowing said green pipe section to harden, and joining a plurality of said pipe sections together in an end-to-end manner with a fiber reinforced polymer composite material.

According to certain illustrative embodiments, a method of making a reinforced concrete pipe comprises providing a hardenable concrete matrix, providing a reinforcement, combining said reinforcement with said hardenable concrete matrix to form a substantially tubular green pipe section not having integral end connections at opposite ends of said green pipe section, wherein said ends of said pipe sections have a substantially uniform wall thickness and outer diameter, allowing said green pipe sections to harden, and joining said pipe shapes together in an end-to-end manner with a fiber reinforced polymer composite material.

According to certain illustrative embodiments, a method of making a reinforced cementitious pipe comprises providing a hardenable cementitious matrix, providing a reinforcement, combining said reinforcement with said hardenable cementitious matrix to form a substantially tubular green pipe section not having bell and spigot end connections at opposite ends of said green pipe section, wherein said ends of said pipe sections have a substantially uniform wall thickness and outer diameter, allowing said green pipe sections to harden, and joining said pipe shapes together in an end-to-end manner with a fiber reinforced polymer composite material.

According to certain illustrative embodiments, a method of making a reinforced concrete pipe comprises providing a hardenable concrete matrix, providing a reinforcement, combining said reinforcement with said hardenable concrete matrix to form a substantially tubular green pipe section not having bell and spigot end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite material.

According to certain illustrative embodiments, a method of making a reinforced cementitious pipe comprises providing a hardenable cementitious matrix, providing an inorganic fiber fabric reinforcement, forming said inorganic fiber fabric reinforcement into a substantially tubular shape, infiltrating said inorganic fiber fabric reinforcement with said hardenable cementitious matrix form a substantially tubular green pipe section not having integral end connections at opposite ends of said green pipe section, and allowing said green pipe shapes to harden, and joining said pipe sections in an end-to-end fashion with a fiber reinforced polymer composite material.

According to certain illustrative embodiments, a method of making a reinforced cementitious pipe comprises providing a hardenable cementitious matrix, providing an inorganic fiber fabric reinforcement, forming said inorganic fiber fabric reinforcement into a substantially tubular shape, infiltrating said inorganic fiber fabric reinforcement with said hardenable cementitious matrix form a substantially tubular green pipe section not having bell and spigot end connections at opposite ends of said green pipe section, and allowing said green pipe shapes to harden, and joining said pipe sections in an end-to-end fashion with a fiber reinforced polymer composite material.

According to certain illustrative embodiments, a method of making a hardened cementitious pipe comprises providing a hardenable cementitious matrix, providing an inorganic fiber fabric reinforcement, forming said inorganic fiber fabric reinforcement into a substantially tubular shape, infiltrating said inorganic fiber fabric reinforcement with said hardenable cementitious matrix form a substantially tubular green pipe section not having integral end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite material.

According to certain illustrative embodiments, a method of making a hardened cementitious pipe comprises providing a hardenable cementitious matrix, providing an inorganic fiber fabric reinforcement, forming said inorganic fiber fabric reinforcement into a substantially cylindrical shape, infiltrating said inorganic fiber fabric reinforcement with said hardenable cementitious matrix form a substantially tubular green pipe section not having bell and spigot end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite material.

According to certain illustrative embodiments, a method of making a reinforced concrete pipe comprises providing a hardenable concrete material, providing a reinforcement, combining said reinforcement with said hardenable concrete material to form a substantially tubular green pipe section not having integral end connections at opposite ends of said green pipe section, allowing said green pipe shapes to harden, and joining said pipe sections together in an end-to-end manner with a fiber reinforced polymer composite material.

According to certain illustrative embodiments, a method of making a reinforced concrete pipe comprises providing a hardenable concrete material, providing a reinforcement, combining said reinforcement with said hardenable concrete material to form a substantially tubular green pipe section not having bell and spigot end connections at opposite ends of said green pipe section, allowing said green pipe sections to harden, and joining said pipe sections together in an end-to-end manner with a fiber reinforced polymer composite material.

According to certain illustrative embodiments, a method of making a reinforced concrete pipe comprises providing a hardenable concrete material, providing a reinforcement, combining said reinforcement with said hardenable concrete material to form a substantially tubular green pipe section not having integral end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite material.

According to certain illustrative embodiments, a method of making a reinforced concrete pipe comprises providing a hardenable concrete material, providing a reinforcement, combining said reinforcement with said hardenable concrete material to form a substantially tubular green pipe section not having bell and spigot end connections at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite material.

According to certain illustrative embodiments, a method of making a reinforced concrete pipe comprises providing a hardenable concrete pipe, providing an inorganic fiber fabric reinforcement, forming said inorganic fiber fabric reinforcement into a substantially cylindrical shape, infiltrating said inorganic fiber fabric reinforcement with said hardenable concrete material form a substantially tubular green pipe section not having integral end connections, such as bell and spigot end connections, at opposite ends of said green pipe section, and allowing said green pipe sections to harden, and joining said pipe sections in an end-to-end fashion with a fiber reinforced polymer composite material.

According to certain illustrative embodiments, a method of making a hardened concrete material pipe comprises providing a hardenable cementitious matrix, providing an inorganic fiber fabric reinforcement, forming said inorganic fiber fabric reinforcement into a substantially cylindrical shape, infiltrating said inorganic fiber fabric reinforcement with said hardenable concrete material form a substantially tubular green pipe section not having integral end connections, such as bell and spigot end connections, at opposite ends of said green pipe section, wherein said ends of said pipe sections have a substantially uniform wall thickness and outer diameter, allowing said green pipe sections to harden, and joining said pipe sections together in an end-to-end manner with a fiber reinforced polymer composite material.

According to certain illustrative embodiments, a method of making a cementitious pipe joint comprises providing a plurality of hardened cementitious pipe sections each of said pipe sections having a longitudinal axis and opposite ends with substantially uniform wall thickness and outer diameters, and without integral end connections for connection the pipe section to another pipe section, such as bell and spigot end connections, on opposite ends of said pipe sections, positioning said pipe sections in an adjacent end-to-end manner along their longitudinal axis with ends in abutting contact, applying a fiber reinforced polymer composite around a portion of the outer circumference of the opposite ends of adjacent pipe sections; and permitting said fiber reinforced polymer composite to cure.

According to certain illustrative embodiments, a method of making a concrete pipe joint comprises providing a plurality of hardened concrete pipe sections each of said pipe sections having a longitudinal axis and opposite ends with substantially uniform wall thickness and outer diameters, and without integral end connections for connection the pipe section to another pipe section, such as bell and spigot end connections, on opposite ends of said pipe sections, positioning said pipe sections in an adjacent end-to-end manner along their longitudinal axis with ends of the pipe sections in abutting contact, applying a fiber reinforced polymer composite around a portion of the outer circumference of the ends of adjacent pipe sections; and permitting said fiber reinforced polymer composite to cure.

Figure 1:
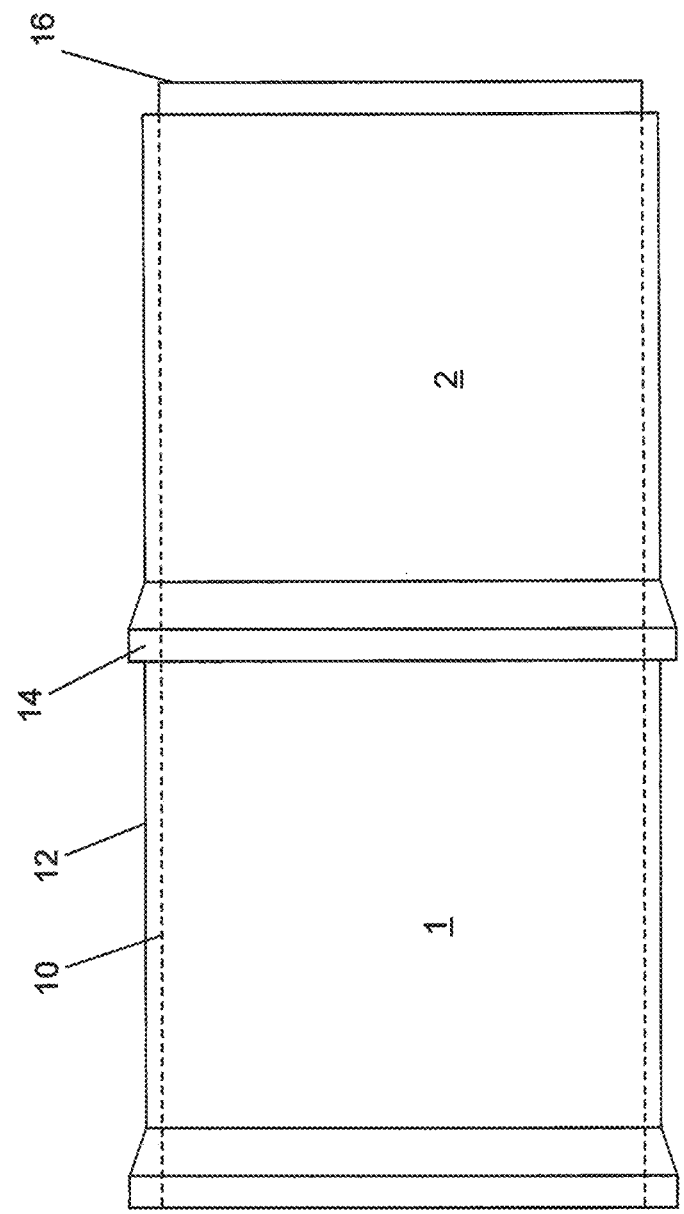
FIG. 1 is a schematic diagram depicting a prior art pipe connection utilizing the bell and spigot pipe connection.

The cementitious pipe comprises a cementitious matrix that is reinforced with a fibrous reinforcement that is at least partially embedded within the cementitious matrix. Alternatively, the fibrous reinforcement is fully embedded within the cementitious matrix. The hardened cementitious pipe sections that are used to form the elongated cementitious pipe do not include integral connection means located at opposite longitudinal ends of the pipe section for connecting one pipe section to another pipe sections. For example, and without limitation, the hardened cementitious pipe sections do not have the standard bell and spigot end connections, or tongue-and-groove connections, that are typically used to connect sections of pipe together to form a longer pipe.

According to further embodiments, a fiber reinforced polymer composite is used as a wrap around adjacent butt joints of cementitious pipe sections to provide a connection between two sections of cementitious pipe. The fiber reinforced polymer composite structurally joins the abutting pipe sections together to form an elongated pipe, and provides a watertight seal between two sections of pipe.

The fiber reinforced polymer composite is comprised of a fibrous reinforcing material and a polymer resin that binds the fibrous component of the composite together, and adheres the fiber reinforced polymer composite to the exterior and/or interior surfaces of the cementitious pipe sections. The fiber reinforced polymer composite is comprised of a fibrous reinforcing material and a polymer resin that binds the fibrous component of the composite together, and adheres the fiber reinforced polymer composite to the exterior and/or interior surfaces of the cementitious pipe sections near the opposite longitudinal ends of the pipe sections that are positioned in abutting contact. The fiber reinforced polymer composite may be applied to the exterior surfaces of the ends of abutting cementitious pipe sections that have been positioned in an end-to-end manner in the direction of the longitudinal axis of the pipe sections, and the polymer component cured after it is applied to the pipe. According to alternative embodiments, the fiber reinforced polymer composite may comprise a preformed fiber reinforced polymer band or ring that is adhered to the surface of the concrete pipe using adhesive or mastic. The fiber reinforced polymer composite wrap has specific fiber orientation and fiber content to allow for adequate load transfer between the pipe sections.

Pipes having integral bell and spigot end connections have one end with a smaller outside diameter, which is known in the art as the spigot end connection, and one end with a larger outer diameter, which is known in the art as the bell connection. The bell and spigot connection pipes are designed such that the spigot end of an adjoining pipe is at least partially inserted into the bell end connection of another pipe. Because the dimensions are not consistent, bell and spigot pipes do not have an even weight distribution and may be more difficult to handle.

In contrast to the prior art concrete pipes, the presently disclosed reinforced cementitious pipes do not have bell and spigot connections at opposite ends of the pipe sections. According to certain embodiments, the cementitious pipes have a substantially uniform wall thickness and substantially uniform inner and outer diameters at the opposite ends of the pipe, such that the pipe sections approximate the shape of a cylinder with open ends. Pipes with substantially uniform wall thickness and inner/outer diameter have a substantially equal weight distribution, which facilitates handling, transportation, and installation. Furthermore, because the inner diameter of the pipe with substantially uniform diameter and wall thickness is consistent from one section to another, fluid flow characteristics may be improved over prior art pipe designs.

According certain embodiments, the fibrous reinforcement may comprise a plurality of discreet fibers that are blended into the cementitious composition. The blend of cementitious composition and randomly dispersed discreet fibers is formed into a green pipe shape that does not have integral connection means located at opposite longitudinal ends of the pipe section for connecting one pipe section to another pipe sections, such as bell and spigot end connections, and preferably has a uniform wall thickness and uniformed inner/outer diameter at least near the opposite ends of the pipe sections. Once the blend of cementitious composition and reinforcing fibers are formed into the green pipe shape, then shape is permitted to harden to form the reinforced cementitious pipe.

The reinforced cementitious pipe sections are manufactured by preparing or providing a cementitious composition or matrix. A suitable fibrous reinforcement is provided and combined with the cementitious composition. According certain embodiments, the fibrous reinforcement may comprise a plurality of discreet fibers that are blended into the cementitious composition. The blend of cementitious composition and randomly dispersed discreet fibers is formed into a green pipe shape that does not have do not include integral connection means located at opposite longitudinal ends of the pipe section for connecting one pipe section to another pipe sections, such as bell and spigot end connections, and preferably has a uniform wall thickness and uniformed outer diameter at least near the opposite ends of the pipe sections. Once the blend of cementitious composition and reinforcing fibers are formed into the green pipe shape, then shape is permitted to harden to form the reinforced cementitious pipe.

According to alternative embodiments, the reinforced cementitious pipe sections are manufactured by preparing or providing a cementitious composition or matrix. A suitable fibrous fabric reinforcement is provided and formed into an elongated substantially tubular shape. The cementitious composition is combined with the fibrous fabric reinforcement by infiltrating the fabric reinforcement with a cementitious composition such that the fabric reinforcement is substantially surrounded or enveloped with the cementitious composition. The cementitious composition is permitted to harden to form the fiber reinforced pipe section.

The method of making the reinforced pipe sections may comprise preparing or providing a cementitous composition, such as a concrete or mortar matrix, providing a fibrous reinforcement in a substantially tubular shape, positioning the tubular shape of fibrous fabric reinforcement into a suitable mold, introducing the cementitious composition into the mold so as to infiltrate or otherwise impregnate the fibrous fabric reinforcement, allowing the cementitious composition to harden, and removing the hardened and reinforced cementitious pipe from the mold.

A pipe joint in formed by joining the ends of abutting or adjacent pipe sections that have been positioned in an end-to-end manner along their longitudinal axis. According to certain illustrative embodiments, the method of forming a pipe joint in a reinforced cementitious pipe comprises providing a plurality of hardened and reinforced cementitious pipe sections. Each of the sections of reinforced cementitious pipe has opposite ends with substantially uniform wall thickness and inner/outer diameters, and without do not include integral connection means located at opposite longitudinal ends of the pipe section for connecting one pipe section to another pipe sections, such as bell and spigot end connections, located at the opposite ends of the pipe sections. The plurality of reinforced cementitious pipe sections are arranged or otherwise positioned in an adjacent end-to-end manner with the end face of one end of one pipe section abutting the face of an end of an adjacent pipe section. A fiber reinforced polymer composite wrap is applied at least partially around the outer circumference of the abutting ends of adjacent cementitious pipe sections. Once the fiber reinforced polymer composite is applied to the surface of the cementitious pipe at or near the abutting ends of the pipe sections, polymer component of the fiber reinforced polymer composite wrap is permitted to cure.

According to any of the above described embodiments of the pipe section or elongated pipe formed by joining a number of pipe sections, the thickness of the pipe section is from about 2 inches to about 11 inches.

According to any of the above described embodiments of the pipe section or elongated pipe formed by joining a number of pipe sections, the outer diameter of the pipe section is from about 12 inches to about 144 inches.

Without limitation, the cementitious matrix that is used to manufacture the pipe sections, and resulting elongated pipe, may include concrete, mortar, grout, and hydraulic paste. According to certain illustrative embodiments, the cementitious matrix used to manufacture the pipe sections is concrete.

According to certain embodiments, the fibrous material for reinforcing the pipe sections is in the form of an open weave fabric that is configured to receive a cementitious material to form a fiber-reinforced cementitious composite. For example, and without limitation, the fibrous material may have a weave structure to facilitate formation of a composite when the cementitious material is applied to the fibrous fabric. According to certain embodiments, the fibrous reinforcement is uni-directional, bi-directional, or omni-directional fabric. The fibers of the uni-directional, bi-directional, or omni-directional fibrous reinforcement comprise any fibers that may be used to prepare a fabric which can absorb tensile stresses and loads that would otherwise crack or break the cementitious matrix of the pipe. A primary consideration in the choice of materials will be resistance to the components of the liquid carried in the pipe. Generally, the weave structure and other properties of the fiber may be specified to facilitate penetration of cementitious matrix into the fiber structure.

The fibrous fabric reinforcement used to reinforce the cementitious composition to manufacture a reinforced cementitious pipe section comprises inorganic fiber fabric, a polymer fiber fabric, a metal fiber fabric, or a metal alloy fiber fabric. The reinforcing fiber fabric may be manufactured one or more than one different type of fiber material. Alternatively, the reinforcement may comprise one or more layer of the same type of fibrous fabric, or more than one layer of different types of fabrics. The number of reinforcing layers depends on the desired pressure rating or desired maximum allowable operating pressure of the pipe. According to certain embodiments, multiple reinforcing layers of fabric may be used to create a repaired pipe. The ultimate load the pipe may be subject to determines the thickness of the reinforcing layer, keeping in mind that excessive thickness unnecessarily reduces pipe capacity.

The inorganic fiber fabrics may be prepared from carbon fibers or glass fibers. The metal alloy fibers may comprise steel fibers. Steel is a common alloy of carbon and iron known for its strength and flexibility as compared with other iron alloys. The polymer fibers may be selected from the group consisting of acrylic polyaramid fibers, polyalkylene fibers such as polyethylene and polypropylene fibers, polyester fibers, nylon fibers and combinations thereof.

The fiber reinforced polymer composite generally comprises a polymer resin material that is reinforced with a fibrous fabric. Without limitation, and only by way of illustration, the fibrous fabric component of the fiber reinforced polymer composite comprises carbon fiber fabrics and glass fiber fabrics. Carbon fibers are useful fibers for their stiffness, strength and application properties, if the carbon fiber materials will be compatible with the underlying pipe. The carbon fibers may be provided in the form of an open, woven carbon fiber fabric. An exemplary form of useful carbon fiber is MASTERBRACE® carbon fiber fabrics available from BASF Corporation (Shakopee, MN, USA).

The fibrous fabric reinforcement is configured to receive a polymer resin, such as such as epoxy and polyurethane polymer resins. Without limitation, suitable polymer resins of the fiber reinforced polymer composite may comprise polyester, epoxy, vinylester, acrylic, modified acrylic, urethane, phenolic, polyamide, bismaleimide, polyurea, or combinations thereof. According to illustrative embodiments, the polymer resin of the fiber reinforced polymer composite comprises an epoxy polymer resin. According to certain embodiments, the polymer resin may further comprise curing agents, accelerators, and colorants as additives. Additives may be included in the polymer resin to affect various resin properties in several ways. Additives may be included that affect the color, curing time, vapor production/inclusion, volatility, viscosity, and miscibility of the resin.

According to illustrative embodiments, the polymer resin of the fiber reinforced polymer composite comprises an epoxy polymer resin and the fabric reinforcement comprises a carbon fiber fabric reinforcement. According to illustrative embodiments, the polymer resin of the fiber reinforced polymer composite comprises an epoxy polymer resin and the fabric reinforcement comprises a glass fiber fabric reinforcement.

According to certain embodiments, the polymer resin component of the fiber reinforced polymer composite comprises from about 95% to about 30% by volume of the fiber reinforced polymer composite and the fibrous reinforcement component of the fiber reinforced polymer composite comprises from about 5% to about 95% by volume of the fiber reinforced polymer composite.

According to certain embodiments, the fibrous fabric of the fiber reinforced polymer composite may have a thickness of from about 0.02 inches to about 0.25 inches; a width of from about 3 inches to about 15 inches, and a length of from about 25 inches to about 500 inches.

It was unexpectedly discovered that fiber reinforced pipe according to the disclosed embodiments could be constructed with a smaller wall thickness and increased length, while maintaining comparable strength to pipes of the prior art, which have greater wall thickness and multiple layers of reinforcement. The fiber reinforcement strengthens the cementitious walls similar to steel rebar, but does so at a fraction of the volume. As the fiber reinforcement requires less volume than traditional rebar reinforcing methods, pipes may be lengthened and the walls may be narrowed without sacrificing strength properties.

In certain embodiments the method of joining pipe sections comprises providing a plurality of reinforced and hardened cementitious pipe sections without bell and spigot end connections at opposite ends of the pipe sections and placing the pipe sections in an end-to-end manner in the direction of the longitudinal axis of the pipe sections with ends of the pipe sections in abutting or adjacent contact. A layer of primer is applied over the exterior surfaces of the abutting ends of the pipe sections. The primer chemically cleans the exterior surface of the abutting pipe sections and facilitates adhesion between the exterior surface of the pipe sections and the fiber reinforced polymer composite. A fiber reinforced polymer composite is applied around the circumference of the exterior surfaces of the abutting ends of the pipe sections and is allowed to cure.

In certain embodiments the method of joining pipe sections comprises providing a plurality of reinforced and hardened cementitious pipe sections without bell and spigot end connections at opposite ends of the pipe sections and placing the pipe sections in an end-to-end manner in the direction of the longitudinal axis of the pipe sections with ends of the pipe sections in abutting or adjacent contact. A layer of primer is applied over the exterior surfaces of the abutting ends of the pipe sections. A layer of polymer resin is applied around the circumference of the exterior surfaces of the abutting ends of the pipe sections. The reinforcing fibrous fabric, such as a bi-directional carbon fiber fabric or bi-directional glass fiber fabric, is at least partially embedded in the layer of polymer resin. Another layer of polymer resin is applied to the reinforcing fibrous fabric layer to cover the fabric. The polymer resin layers are allowed to cure to form a cured fiber reinforced polymer composite.

In certain embodiments the method of joining pipe sections comprises providing a plurality of reinforced and hardened cementitious pipe sections without bell and spigot end connections at opposite ends of the pipe sections and placing the pipe sections in an end-to-end manner in the direction of the longitudinal axis of the pipe sections with ends of the pipe sections in abutting or adjacent contact. A layer of primer is applied over the exterior surfaces of the abutting ends of the pipe sections. The primer chemically cleans the exterior surface of the abutting pipe sections and facilitates adhesion between the exterior surface of the pipe sections and the fiber reinforced polymer composite. A cured fiber reinforced polymer composite in the form of a band or ring is secured around the circumference of the exterior surfaces of the abutting ends of the pipe sections.

In certain embodiments the method of joining pipe sections comprises providing a plurality of reinforced and hardened cementitious pipe sections without bell and spigot end connections at opposite ends of the pipe sections and placing the pipe sections in an end-to-end manner in the direction of the longitudinal axis of the pipe sections with ends of the pipe sections in abutting or adjacent contact. A layer of primer is applied over the exterior surfaces of the abutting ends of the pipe sections. A layer of adhesive is applied over the primer layer and around the circumference of the exterior surfaces of the abutting ends of the pipe sections. A cured fiber reinforced polymer composite in the form of a band or ring is applied to the adhesive layer and fits around the circumference of the exterior surfaces of the abutting ends of the pipe sections.

Each selected pipe section having substantially the same dimensions is placed end to end. The end sections are then placed in adjacent contact. Adjacent physical contact with another pipe section end is desired to minimize and eliminate gaps which could increase fluid leakage through the joined pipes. Once the pipe sections are in adjacent contact, the fiber reinforced polymer composite is wrapped around end sections in adjacent contact. The fiber reinforced polymer composite seals any remaining gaps between the pipe sections in adjacent contact to prevent leakage. Once the fiber reinforced polymer composite cures, a durable joint between the pipe sections in adjacent contact is created.

In certain embodiments, after the pipe sections are placed in adjacent contact, an adhesive is applied over at least a portion of an exterior surface which has been coated with a primer. The combination of the primer and adhesive further improves the adhesion between the exterior surface of the first and second pipe sections and the fiber reinforced polymer composite. In certain embodiments, the primer coating layer may be applied over a greater surface area of the pipe section ends placed in adjacent contact than the adhesive.

According to certain embodiments, the fabric reinforcement of the fiber reinforced polymer composite is applied to the exterior surface of the pipe sections in wither a wet or dry state. In certain embodiments, the fibrous fabric reinforcement is first dipped in a polymer resin and saturated. The resulting resin saturated fiber reinforced polymer is then applied to an exterior surface of the pipe. The saturated or partially saturated fiber reinforced polymer is considered to be "wet layup" by those skilled in the art.

In certain embodiments, the fibrous fabric reinforcement is applied to the exterior surfaces of the pipe sections in a dry state. A polymer resin layer is first applied to the exterior surfaces of the pipe sections. The dry fibrous fabric reinforcement is embedded in the wet polymer layer and a second polymer resin layer is applied over the fabric reinforcement. The resulting resin saturated fiber reinforced polymer may be allowed to partially cure and is then applied to an outer surface of the pipe. The saturated or partially saturated fiber reinforced polymer which is partially cured is considered to be "dry layup" by those skilled in the art.

FIG. 1 shows a pipe connection according to the prior art. Each of pipes 1,2 have an inner wall 10 and an outer wall 12 and a thickness extending between 10 and 12. The opposite ends of pipes 1 and 2 have bell 14 and spigot 16 connections. The pipes are designed such that spigot connection 16 will be inserted into the bell connection 14 as the pipe sections are assembled to create a longer pipe. A tight connection between spigot connection 16 and bell connection 14 is particularly important in applications where water or fluids are transported through the pipe. A rubber sealing gasket may be needed to prevent water or fluid leakage.

Figure 2:
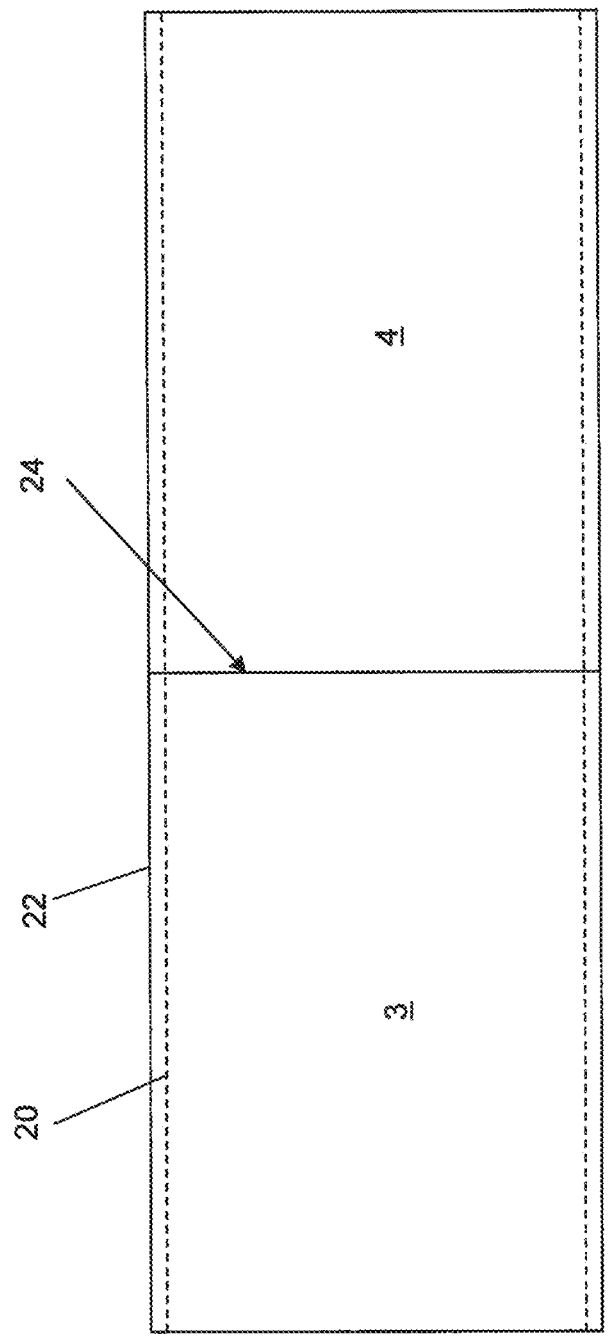
FIG. 2 is a side view of an illustrative embodiment of the presently disclosed pipe joint connection for the reinforced concrete pipe.

FIG. 2 shows a pipe connection in accordance with the present disclosure. Pipe sections 3 and 4 have an inner wall 20 and outer wall 22. The thickness of pipe sections 3 and 4 is substantially uniform along the length of the pipe. The ends of pipe sections 3 and 4 are positioned in abutting contact to form a butt joint 24.

Figure 3:
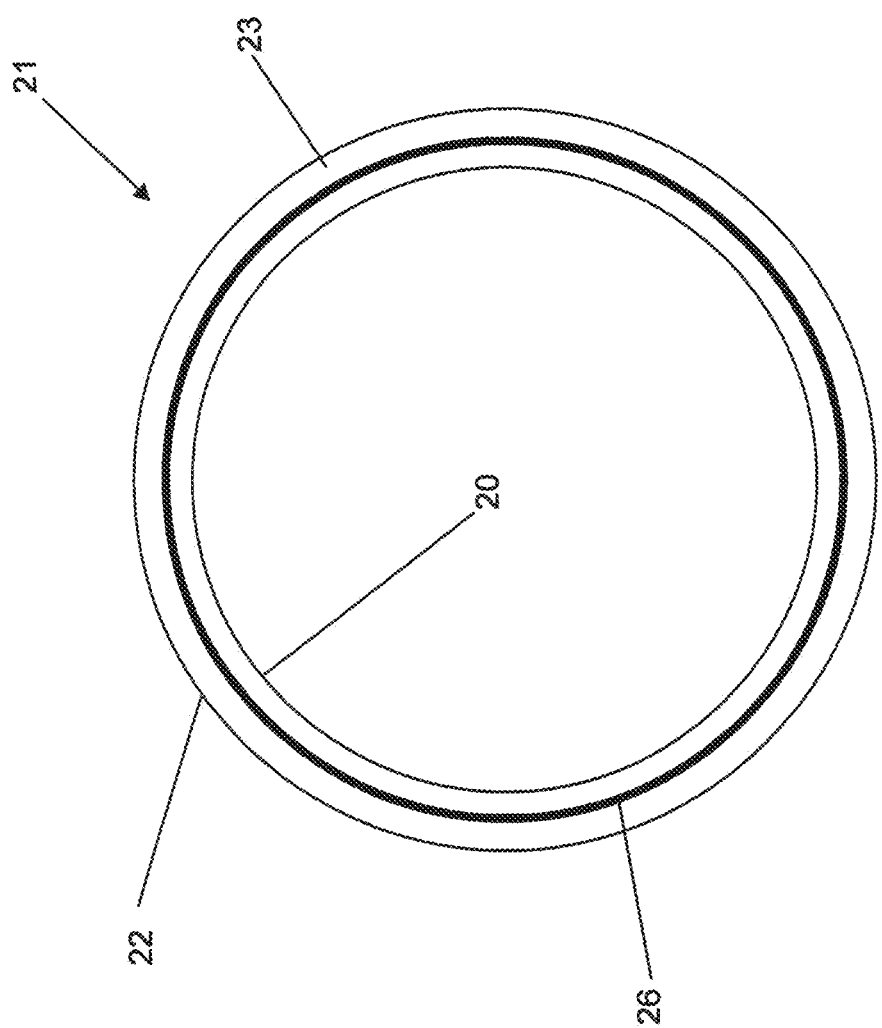
FIG. 3 is a cross section of an illustrative embodiment of the reinforced concrete pipe.

FIG. 3 depicts a cross-section of an illustrative embodiment of the fiber reinforced pipe. The pipe 21 has an inner wall 20 and outer wall 22, and a substantially uniform thickness. The pipe itself is made of a concrete or cementitious matrix 23 with a fiber reinforcement 26 at least partially embedded within the cementitious matrix.

Figure 4:
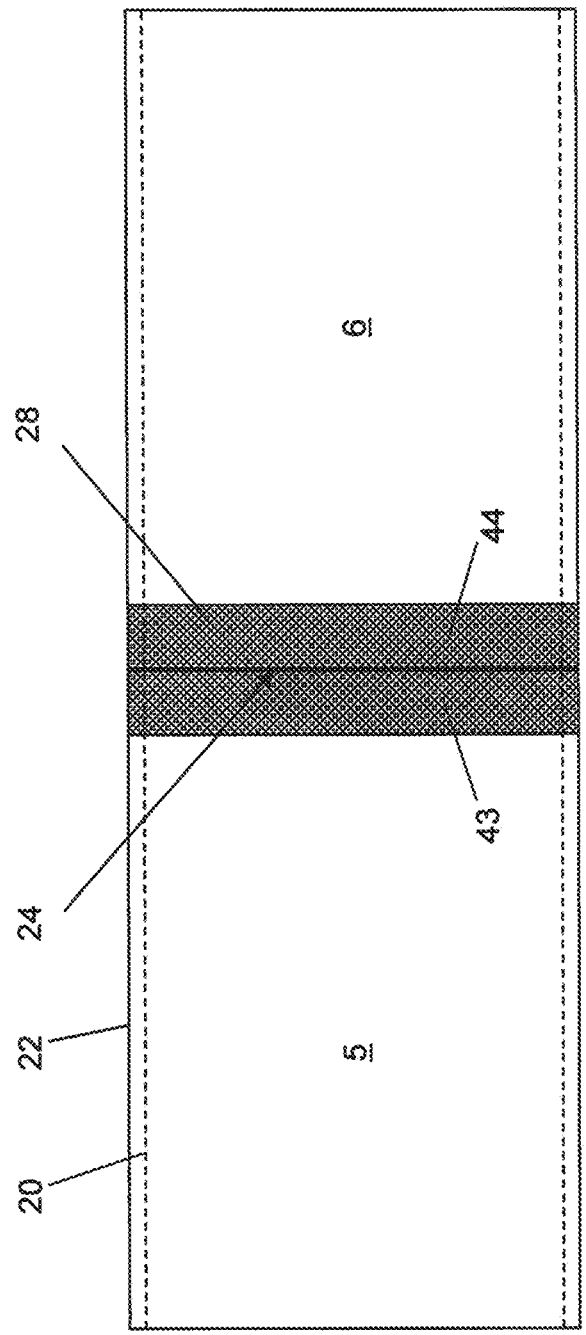
FIG. 4 is a side view of adjacent pipe sections joined by a fiber reinforced polymer composite.
Figure 4A:
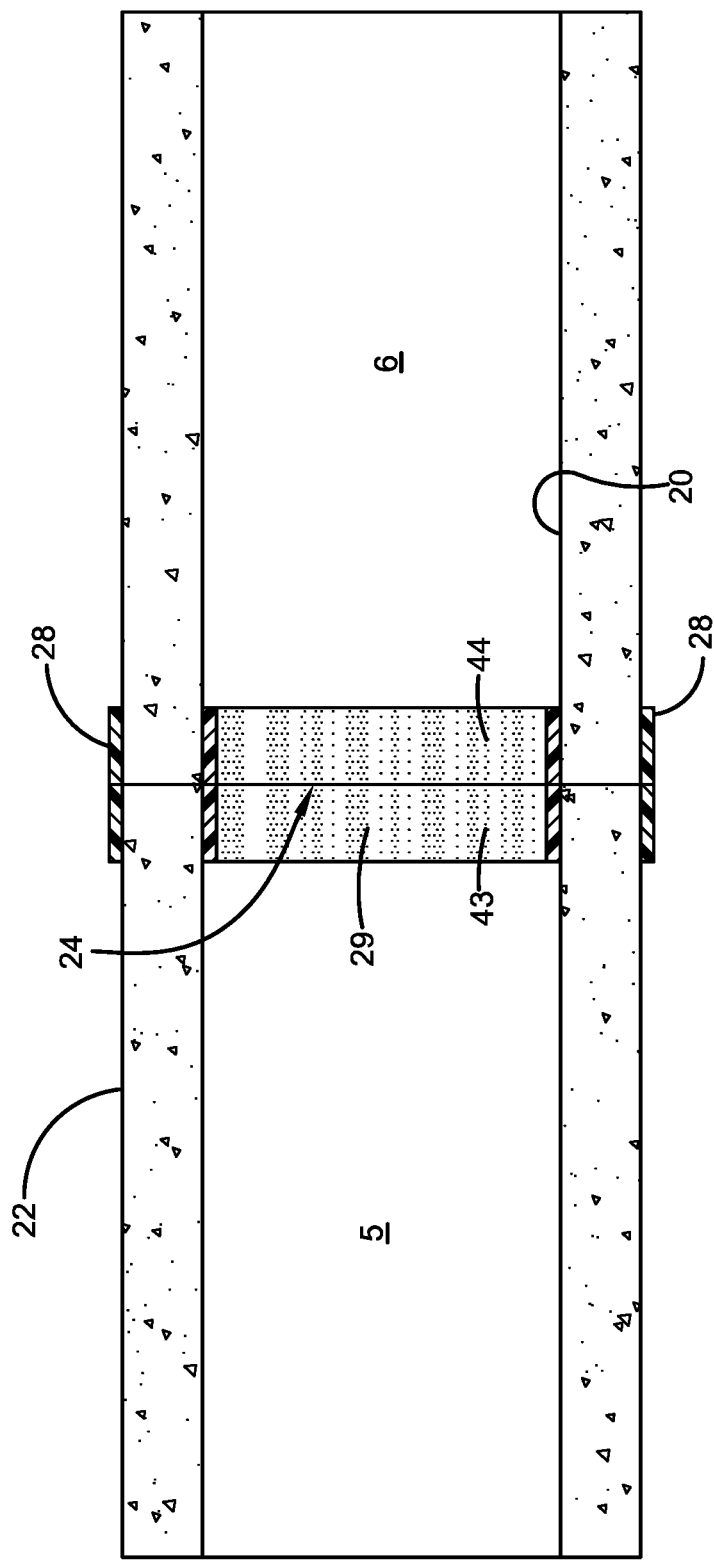

FIG. 4 depicts a fiber reinforced polymer composite 28 joining the ends 43 and 44 of pipe sections 5 and 6. Pipe sections 5 and 6 have an inner wall 20 and an outer wall 22. The fiber reinforced polymer composite 28 is wrapped about the outer wall 22 to protect the joint 24 between pipe sections 5 and 6. Fiber reinforced polymer 28 creates a sealed, durable, reinforced joint which is suitable for transporting fluids or gases.

EXAMPLES

A relatively thin wall, having 60 inch inside diameter (ID) concrete pipe without fiber reinforcement was prepared and shear tested in accordance with ASTM C497. The pipe was prepared without bell and spigot end connections, and the two sections of pipe were joined with a fiber reinforced polymer composite. Both pipe sections had substantially the same diameter and substantially the same wall thickness.

Figure 5:
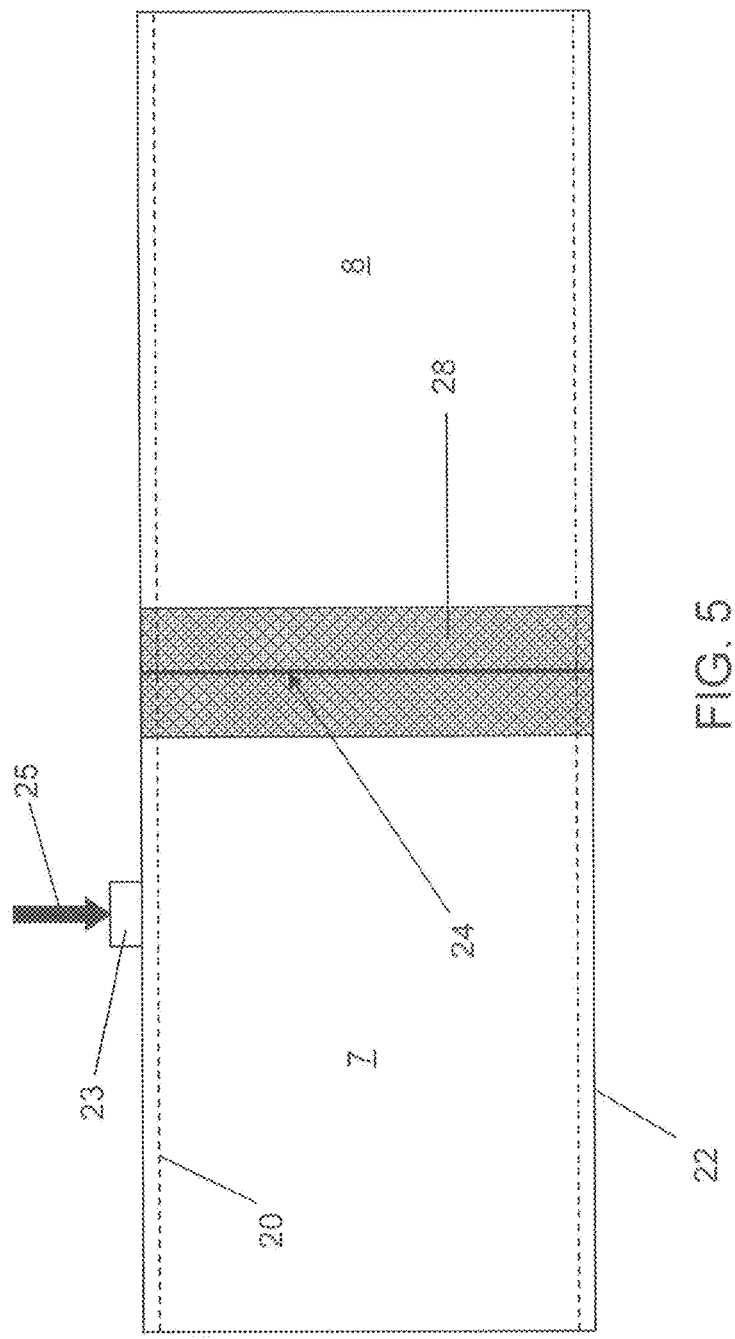
FIG. 5 is a side view of an illustrative embodiment of adjacent pipe sections joined by a fiber reinforced polymer composite and subjected to shear testing.

FIG. 5 depicts the shear testing set up according to ASTM C497. Pipe sections 7 and 8 each had inner wall 20 and outer wall 22. The pipes were laid end to end to create joint section 24, with the pipe ends in adjacent contact. A fiber reinforced polymer was applied around the joint 24 on the outer wall 22 of pipes 7 and 8. A loading location 23 was created with several wooden boards banded together. A loading force 25 was applied downward on the loading location 23, and subsequently transferred to pipe 7.

The pipe sections were laid end to end fashion. Outer surface 22 of pipes 7 and 8 were cleaned with surface preparation chemicals. A chemical primer was applied around the outer surface 22 at joint 24, to a width of about 18 inches. Over the primer, a fiber reinforcement band having a width of 12 inches was applied on outer surface 22 around joint 24. An epoxy coat was applied over the entire fiber reinforcement band, and the 18 inch width covered by the primer. The epoxy bonded with the fiber reinforcement band to create a fiber reinforced polymer around the pipe end joint.

Figure 6A:
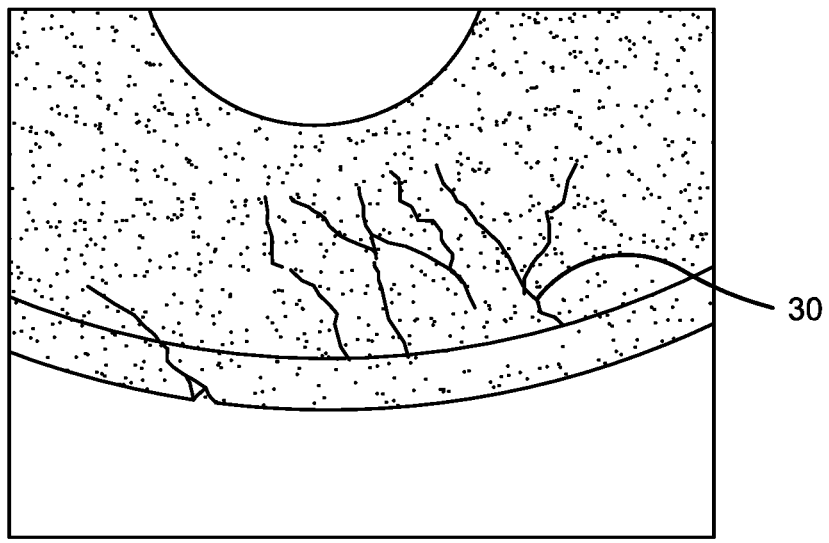
FIG. 6A is a photograph depicting the crack propagation of a non-reinforced concrete pipe subjected to shear testing in accordance with ASTM C497.

According to the ASTM C497 standard, a concrete pipe section subjected to load 25 must withstand a force of at least 20,000 lbf. without developing any cracking. The concrete portion of the pipe tested in accordance with the ASTM standard passed the testing regimen as it did not develop any cracking in response to a 20,000 lbf force. It is note that the test pipe section only developed crack after exposure to a load of 28,000 lbf. FIG. 6A depicts the cracks 30 that propagated axially along the pipe after being subjected to loading.

Figure 6B:
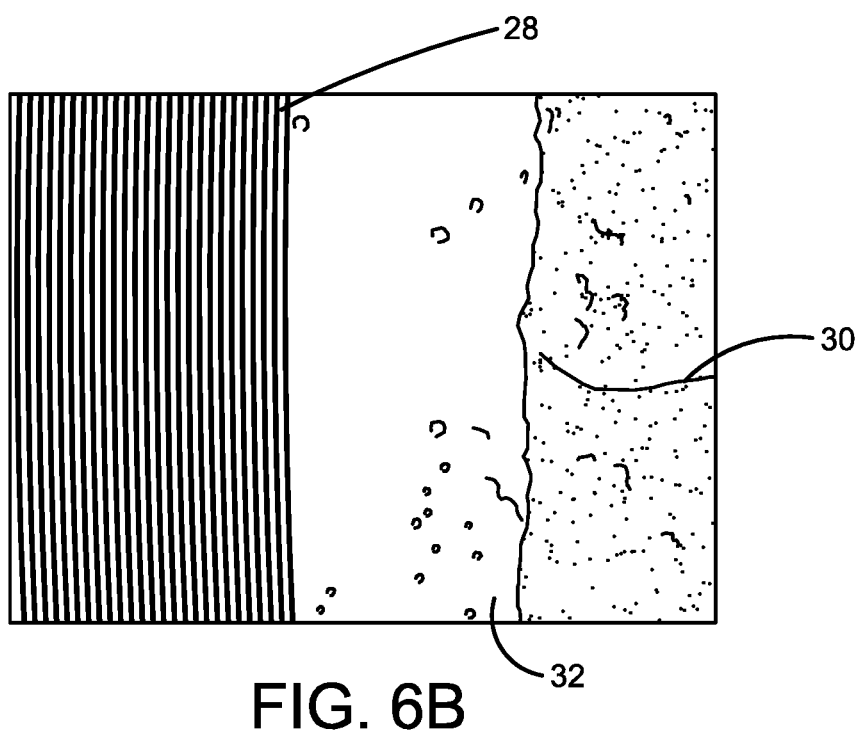
FIG. 6B depicts the termination of crack propagation under shear testing of a concrete pipe having ends joined with a fiber reinforced polymer matrix.

FIG. 6B depicts how the crack 30 stopped as it reached the margin of the fiber reinforced polymer composite along joint 24. Even as the concrete pipe failed at a load of 28,000 lbf, the region of the concrete pipe that was reinforced with the fiber reinforced polymer composite 28 was not damaged by the load or the shearing forces created along with the load.

Figure 7:
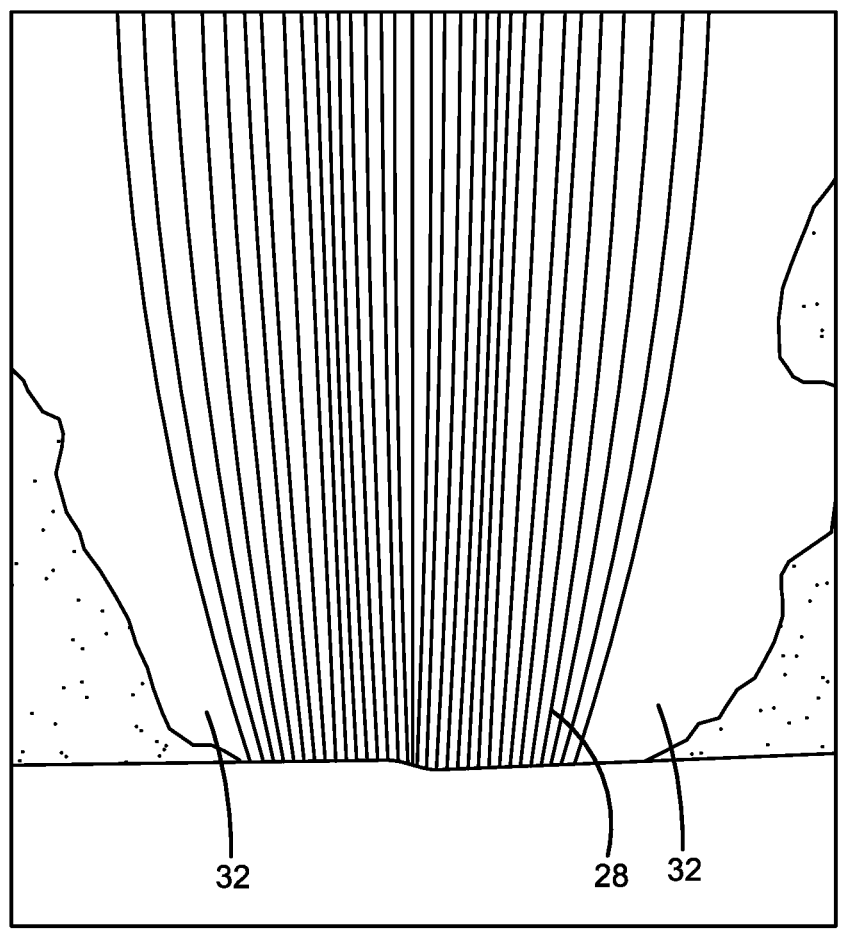
FIG. 7 is a photograph depicting the structural integrity of a pipe butt joint joined with a fiber reinforced polymer matrix.

FIG. 7 depicts the deformation created by the ASTM C497 shear testing. The epoxy layer 32 is approximately 18 inches wide. The fiber reinforced polymer 28 is approximately 12 inches wide. Both the epoxy layer 32 and fiber reinforced polymer 28 were applied over pipe end joint 24, before the pipes were subjected to shear testing. As seen at displacement section 34, the pipes have been offset by several inches due to the cyclic loading an unloading in ASTM C497 shear tests.

Figure 8:
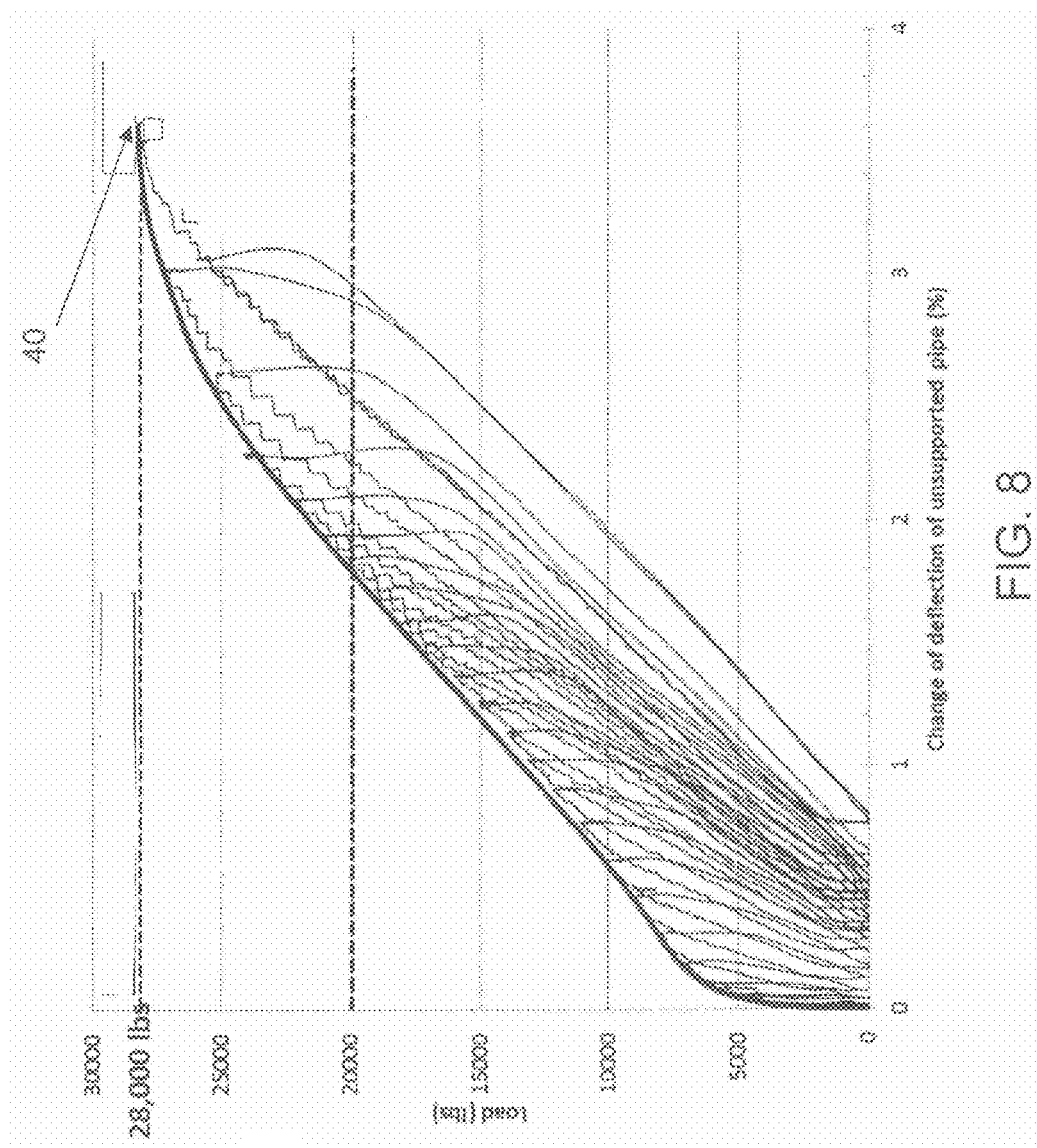
FIG. 8 is a graph depicting the load and deflection behavior of a concrete pipe with a fiber reinforced polymer end connection that has undergone shear testing in accordance with ASTM C497.

FIG. 8 depicts the relationship between applied load and change in deflection of the tested pipe. Point 40 shows where the test pipe failed, at a load of 28,000 lbf and a deflection greater than 3.6%.

While the pipe and fiber reinforced polymer have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the pipe and fiber reinforced polymer should not be limited to any single embodiment, but rather construed in breadth and scope in accordance with the recitation of the appended claims.

We claim:

1. A cementitious pipe comprising:
   a plurality of reinforced cementitious pipe sections comprising a hardened cementitious matrix and a reinforcement comprising a plurality of polymer fibers randomly dispersed in said hardened cementitious matrix, said reinforced cementitious pipe sections not having integral end connections located at opposite longitudinal ends of the pipe section for connecting one pipe section to another pipe section, said reinforced cementitious pipe sections have a wall thickness from about 2 inches to about 5 inches and a diameter of about 60 inches to about 110 inches, said reinforced cementitious pipe sections positioned in abutting contact in an end-to-end manner along their longitudinal axis to form a joint, said reinforced cementitious pipe sections are joined together in said end-to-end manner with a fiber reinforced polymer composite wrapped around the joint, and a polymer layer applied over the fiber reinforced polymer composite, the fiber reinforced polymer composite having a first width and the polymer layer having a second width wider than the first width; wherein the fiber reinforced polymer composite wrapped around the joint consisting essentially of a layer of polymer resin, a reinforcing fibrous fabric at least partially embedded in the layer of polymer resin, and another layer of polymer resin to cover the fibrous fabric layer.

2. The cementitious pipe of claim 1, wherein the cementitious matrix is selected from the group consisting of concrete, mortar, grout, and hydraulic paste.

3. The cementitious pipe of claim 2, wherein the cementitious matrix comprises concrete.

4. The cementitious pipe of claim 1, wherein said reinforcement further comprise inorganic fibers.

5. The cementitious pipe of claim 1, wherein the polymer resin is selected from the group consisting of an epoxy, polyester, vinylester, acrylic, modified acrylic, urethane, phenolic, polyamide, bismaleimide, polyurea, and combinations thereof.

6. The cementitious pipe of claim 5, wherein said reinforcing fibrous fabric is selected from the group consisting of a carbon and fiberglass fabric.

7. The cementitious pipe of claim 6, wherein the polymer resin comprises an epoxy.

8. The cementitious pipe of claim 7, wherein said fiber reinforced polymer composite is attached around the outer circumference near the ends of said adjacent pipe sections.

9. The cementitious pipe of claim 8, wherein said fiber reinforced polymer composite is attached around both the inner and the outer circumference near the ends of said adjacent pipe sections.

10. The cementitious pipe of claim 1, wherein the cementitious pipe does not develop cracking in response to a force of at least 20,000 lbf as measured by ASTM C497 shear testing.

11. The cementitious pipe of claim 1, wherein the polymer resin component of the fiber reinforced polymer composite comprises from about 30% to 95% by volume of the fiber reinforced polymer composite and the fibrous component of the fiber reinforced polymer composite comprises from about 5% to about 95% by volume of the fiber reinforced polymer composite.

* * * * *